United States Patent [19]

Chamberlain

[11] 4,213,684
[45] Jul. 22, 1980

[54] SYSTEM FOR FORMING A QUADRIFID IMAGE COMPRISING ANGULARLY RELATED FIELDS OF VIEW OF A THREE DIMENSIONAL OBJECT

[76] Inventor: Robert A. Frosch, Administrator of the National Aeronautics and Space Administration, with respect to an invention of Frederick R. Chamberlain, Sun Valley, Calif.

[21] Appl. No.: 888,432

[22] Filed: Mar. 20, 1978

[51] Int. Cl.² .................. G02B 5/08; G03B 15/02; G03B 41/00
[52] U.S. Cl. .................. 354/118; 350/301; 362/11; 362/241
[58] Field of Search .......... 354/110, 117, 118, 119, 354/120, 150, 62, 126; 33/1 K; 35/58; 350/32, 171, 301; 352/93, 94; 353/30, 99; 362/3, 8, 11, 16, 241

[56] References Cited

U.S. PATENT DOCUMENTS

| | | | |
|---|---|---|---|
| 2,045,093 | 6/1936 | Newcomer | 354/117 |
| 2,568,327 | 9/1951 | Dudley | 354/117 |
| 2,664,780 | 1/1954 | Waller | 354/290 X |
| 3,343,279 | 9/1967 | Elkins | 35/58 X |
| 3,586,429 | 6/1971 | Cords | 352/93 |
| 3,699,856 | 10/1972 | Chabot et al. | 354/62 |
| 4,018,519 | 4/1977 | Clapp | 354/110 X |

FOREIGN PATENT DOCUMENTS

| | | | |
|---|---|---|---|
| 2226357 | 12/1973 | Fed. Rep. of Germany | 354/120 |
| 697217 | 10/1965 | Italy | 354/110 |

*Primary Examiner*—L. T. Hix
*Assistant Examiner*—Thomas H. Tarcza
*Attorney, Agent, or Firm*—Monte F. Mott; John R. Manning; Wilfred Grifka

[57] ABSTRACT

A system for generating within a single frame of photographic film a quadrified image including images of angularly, including orthogonally, related fields of view of a near field three dimensional object and characterized by a first subsystem including a plurality of reflective surfaces for imaging a first field of view of the object at one quadrant of the quadrifid image, a second subsystem including a plurality of reflecting surfaces for imaging a second field of view of the object at a second quadrant of the frame and a third subsystem including a plurality of reflecting surfaces for reflectively imaging a third field of view of the object at a third quadrant of the quadrifid image, all of which have identical path lengths to the object photographed.

2 Claims, 3 Drawing Figures

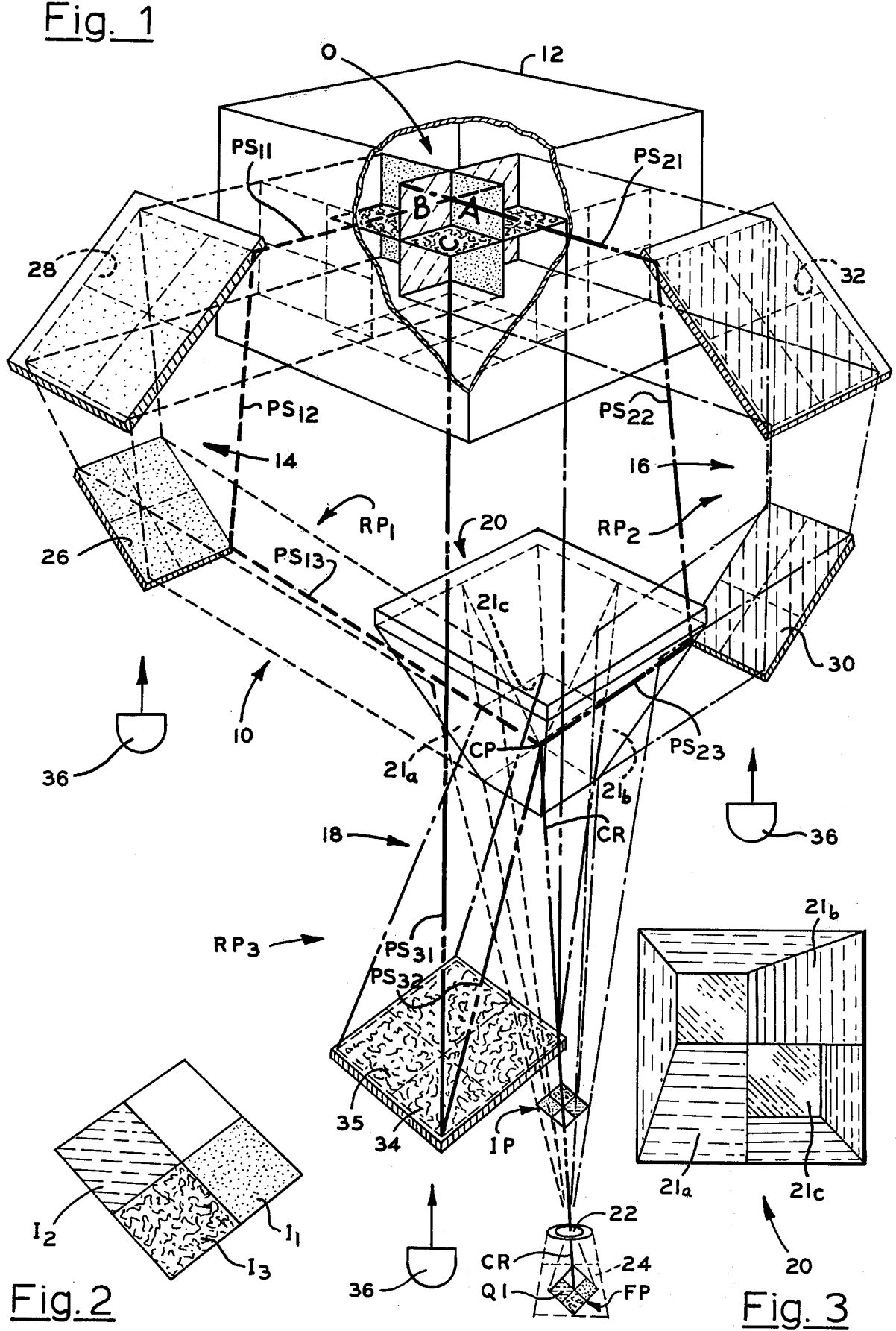

SYSTEM FOR FORMING A QUADRIFID IMAGE COMPRISING ANGULARLY RELATED FIELDS OF VIEW OF A THREE DIMENSIONAL OBJECT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention generally relates to a system for imaging a plurality of separate fields of view of a given object in a common plane, and more particularly to an improved system for combining in a single photographic film frame a plurality of images of angularly, including orthogonally, related fields of view of a three dimensional object for thus providing a photograph of a quadrifid image consisting of a plurality of images of angularly, including orthogonally, related fields of view of the object.

2. Description of the Prior Art

The prior art, of course, includes numerous systems and subsystems for reflectively imaging fields of view of objects in selected planes at various locations. For example, U.S. Pat. No. 2,045,093 discloses a system wherein a plurality of mirrors and their associated assembly mirrors are angularly exposed so that rays from an object when reflected from the assembly mirrors pass through an objective lens to impinge on a light sensitive surface. This surface receives a multiplicity of parallactically displaced images corresponding to different angular views of an object in horizontal extension. Additionally, U.S. Pat. No. 2,568,327 discloses a reflecting means arranged in laterally spaced relation for causing left-eye views and right-eye views to become superimposed for recording on photographic film or plate.

However, as can be appreciated by those engaged in research as well as those familiar with the design and fabrication of photographic equipment, there currently exists a need for a system having a capability for simultaneously formating and photographing images of angularly, related fields of view of a near field three dimensional object whereby a comparative study of angularly, related fields of view simultaneously photographed is facilitated.

Consequently, it is the purpose of the instant invention to provide an improved system for combining in a common plane images of angularly, including orthogonally, related fields of view arranged to form a composite image consisting of at least three images of separate angularly, including orthogonally, related fields of view.

OBJECTS AND SUMMARY OF THE INVENTION

It is, therefore, an object of the instant invention to provide an improved system for forming a composite image of a plurality of angularly, including orthogonally, related fields of view.

It is another object to provide a system for formating and photographing a plurality of angularly, related fields of view of a three dimensional object, with equal path lengths to the object in each field of view.

It is another object to provide in a system for focusing at the film plane of a camera a quadrifid image including at least three angularly, including orthogonally, related fields of view of a three dimensional object, with equal path lengths to the object for each field of view, whereby the fields of view are caused to be equally well focused.

Another object is to provide an improved system for forming a composite image consisting of separate images of a plurality of fields of view having particular utility in the field of photography and the like, although not necessarily restricted in use thereto, since the system may be employed equally as well in operative environments in which angularly, related fields of view are optically scanned simultaneously.

These and other objects and advantages are achieved through the use of an improved system for forming a quadrifid image consisting of separate images of angularly, related fields of view, characterized by a plurality of reflective surfaces adapted to reflect images of the fields of view along a plurality of folded paths of a common length to be separately imaged and formated into a quadrifid image for thus facilitating a simultaneous photographic recording of equally well focused fields of view.

BRIEF DESCRIPTION OF THE DRAWING

FIG. 1 is a schematic view illustrating an improved system which embodies the principles of the instant invention.

FIG. 2 is a perspective view pictorially representing a quadrified image obtained through a use of the system shown in FIG. 1.

FIG. 3 is a bottom pictorial view depicting an image combining mirror assembly provided for the system shown in FIG. 1.

DESCRIPTION OF THE PREFERRED EMBODIMENT

Referring now to the drawing wherein like reference characters designate like or corresponding parts throughout the several views there is shown in FIG. 1 a system, generally designated 10, comprising an embodiment of the instant invention.

As illustrated in FIG. 1 a three dimensional object, designated O, is supported to be photographically recorded within a transparent housing 12. The object O includes a plurality of surfaces lying in orthogonally related object planes, designated A, B and C. For the sake of convenience, the object O is depicted as being levitated within the housing for thus facilitating a simultaneous viewing of at least three sides of the object. However, it should be apparent that the object need not be disposed within a housing or levitated in order to accommodate a simultaneous viewing of its surface employing the system 10.

The system 10, as illustrated, includes a first subsystem, generally designated 14, a second subsystem, generally designated 16, and a third subsystem, generally designated 18. These subsystems simultaneously serve to reflect contiguous images, designated $I_1$, $I_2$ and $I_3$, FIG. 2, of fields of view of the object planes A, B and C along folded paths, not designated, of a common equalized path length for providing an image presentation hereinafter simply referred to as a composite image IP pictorially illustrated as being positioned along the optic axis for a camera aperture 22 of a suitably positioned camera 24, FIG. 1.

The subsystems 14, 16 and 18 include, in common, an image combining mirror assembly, generally designated 20, having three angularly related reflective surfaces 21a, 21b and 21c. As will hereinafter become more readily apparent, these surfaces serve to reflect incident light rays through the aperture 22 for a camera 24, whereby images $I_1$, $I_2$ and $I_3$ are focused to provide a quadrifid image QI at the film plane FP for the camera. While not designated, it is to be understood that within the aperture 22 there is disposed a suitable lens assembly, not designated, the purpose of which is to focus the composite image IP provided by the system 10 at the film plane. Hence, it will be appreciated that the composite image IP is provided as a quadrifid image QI at the film plane FP to be photographically recorded.

In practice, the plane of surfaces 21a and 21b are inclined at 45° with respect to the optic axis of the aperture of the camera 24 while the plane of the surface 21c is inclined at an angle established in a manner hereinafter more fully discussed. Moreover, it should be noted that the surfaces 21a, 21b and 21c are not square or even rectangular, although the shape of each is such that the image reflected therefrom substantially fills one quadrant square of the quadrifid image QI at the film plane.

As shown, the first subsection 14 includes a mirror 26 and a mirror 28 having reflective surfaces which cooperate to reflect the image of the object plane A along a first folded path, aforementioned, which may be assumed to include a first segmented ray path $RP_1$ and which extends from the object plane A to the film plane FP. The reflective surface of the mirror 28 is inclined at 45° with respect to the object plane A, while the reflective surface of the mirror 26 is perpendicular to plane A and is inclined at 45° with respect to the reflective surface of mirror 28. Moreover, it is noted that the reflective surface of the mirror 26 is disposed in substantial parallelism with the reflective surface 21a of the mirror assembly 20.

In order to more fully explain the length relationship of the folded paths, aforementioned, it should be noted that the ray path $RP_1$ includes a first ray path segment, designated $PS_{11}$, extending from one corner of the object plane A to one corner of the reflective surface of the mirror 28. A second ray path segment $PS_{12}$ is extended from the point of incidence for path segment $PS_{11}$, located at one corner of the surface mirror 28, to one corner of the reflective surface of the mirror 26. A third path segment, designated $PS_{13}$, is extended from the point of incidence for the segment $PS_{12}$, located at one corner of the reflective surface of the mirror 26, to one corner of the surface 21a for the mirror assembly 20. A terminal path segment extends from the surface 21a to the film plane FP, along a path coincident with the axis of the aperture 22. Consequently, it should now be appreciated that the image of the object plane A is reflected by the surfaces of the mirror 26, 28 and 21a and imaged at the film plane FP of the system 10.

The second subsystem 16 is similar in design and function to the subsystem 14, aforedescribed, and is symmetrical therewith. The subsystem 16 includes a plurality of angularly related reflective surfaces including the surfaces of cooperating mirrors 30 and 32, as well as the reflective surface 21b, also aforementioned. These surfaces are interrelated in a manner similar to that in which the reflective surfaces of the mirrors 26 and 28 and the reflected surface 21a are interrelated and serve to reflect an image of the object plane B along a second folded path to the film plane FP. The second folded path, likewise, may be assumed to include a second segmented ray path, designated $RP_2$.

The ray path $RP_2$ includes a first path segment, designated $PS_{21}$, which extends from one corner of the object plane B to one corner of the reflective surface of the mirror 32. From the point of incidence of the path segment $PS_{21}$ with the surface of the mirror 32, there is extended a second path segment, designated $PS_{22}$. The path segment $PS_{22}$ intersects the reflective surface of the mirror 30, at one corner thereof, and from the point of intersection of the path segment $PS_{22}$, with the reflective surface of the mirror 30, there extends a third path segment designated $PS_{23}$. The path segment $PS_{23}$ then strikes the reflective surface 21b, also at one corner thereof.

From the point of incidence of the path segment $PS_{23}$ with the reflective surface 21b, there is extended a terminal segment for ray path $RP_1$. This segment is coincident with the terminal segment of the ray path RP. Hence, the terminal segments of the ray paths $RP_1$ and $RP_2$ define a terminal path segment common to both ray paths, designated CR. It is here noted that the mirrors 28 and 32 are so positioned that the ray path $RP_1$ is projected from the top lefthand corner of plane A while the ray path $RP_2$ is projected from the top lefthand corner of plane B. Hence, the images $I_1$ and $I_2$ are provided in adjacent quadrants of the quadrifid image QI at the film plane FP.

Turning now to subsystem 18, FIG. 1, it is noted that within this subsystem there is arranged in substantial vertical alignment with the object plane C of the object O a mirror 34 having a planar reflecting surface 35 inclined slightly with respect to the object plane C, and disposed in parallelism with the reflective surface 21c of the image combining assembly 20. Consequently, the image of object plane C is reflected to the film plane along a third folded path which may be assumed to include a folded ray path designated $RP_3$.

The ray path $RP_3$ includes the first path segment, designated $PS_{31}$, which extends from the upper right hand corner of the object plane C, as seen by the reflecting surface 35, to one corner of that surface. From the point of incidence of the path segment $PS_{31}$ with the surface 35, there is extended a second path segment, designated $PS_{32}$, which, in turn, strikes one corner of the reflective surface 21c of the image combining assembly 20. From the surface 21c there extends a terminal path segment coincident with the path segment CR, aforementioned.

The surfaces 21c, of the assembly 20, and 35 of the mirror 34 cooperate to reflectively position the image $I_3$ in the film plane FP, in a quadrant adjacent to the images $I_1$ and $I_2$. Thus, the images $I_1$, $I_2$, and $I_3$ comprise three separate and contiguous images reflected along separate folded paths of equal lengths toward the aperture 22. Hence, it will be appreciated that the images $I_1$, $I_2$, and $I_3$ are equally well focused at the film plane FP of the camera 24 and comprise adjacent quadrants for the quadrifid image QI. The remaining or blank quadrant of the quadrifid image is, where so desired, employed for purposes of incorporating in the image QI identification information and/or other other data.

As a matter of interest, it is noted that where so desired, the mirrors 26, 30 and 34 comprise beam splitters which accommodate passage of light from axially aligned lamps, designated 36, in a direction opposite to that in which light from the object O travels. Thus illumination of planes A, B and C is facilitated.

As aforementioned the ray paths $RP_1$, $RP_2$ and $RP_3$ are of equal lengths so that all object planes may be focused equally well by the lens of the camera 24. It should be apparent that ray paths $RP_1$ and $RP_2$ are equal by symmetry and it will be recalled that the terminal segment CR is common to all three ray paths. However, it should be noted that the position of mirror 34 must be adjusted in order to assure that the sum of the combined lengths of segments $PS_{31}$ and $PS_{32}$ of ray path $RP_3$ equals the sum of the length of segments $PS_{11}$, $PS_{12}$ and $PS_{13}$, as well as the sum of segments $PS_{21}$, $PS_{22}$ and $PS_{23}$ of ray paths $RP_1$ and $RP_2$, respectively.

It is important to note that the surface 35 of mirror 34 and surface 21c are tilted relative to the vertical, at the same angle, and that so long as surfaces 35 and 21c remain in planes parallel to each other and are spaced appropriately as to separation of their planes, they ultimately refect rays from one corner of the object plane C along $PS_{31}$ coincident with the camera's optical axis.

As the surfaces 35 and 21c approach 90° with respect to vertical the shape of the surface 21c approaches a square while the surface 35 drops further below the object plane C. The surface 21c is thus trimmed to its exact field of view and the size and shape of the image reflected thereby approaches the size and shape of the object plane C.

To exemplify calculations employed in equalization of path lengths, it is useful to assign valves to the systems components and paths. Assume, therefore, that object planes A, B and C are represented by 10 cm×10 cm (3.9370 inches×3.9370 inches) with the object O being centered in housing 12 and that the housing has an inside dimension of 6.0 inches×6.0 inches×6.6654 inches and a wall thickness of 0.5000 inches. Assume, also, that path segments $PS_{21}$, $PS_{22}$ and $PS_{23}$ have a total length of 15.3327 inches, and that segment CR has a length of 4.6673 inches. By symmetry, $PS_{11}=PS_{21}$, $PS_{12}=PS_{22}$ and $PS_{13}=PS_{23}$. Thus the total path length of ray paths $RP_1$ and $RP_2$ equals twenty inches. The design criteria heretofore discussed is arbitrary but simple.

With respect to ray path $RP_3$ it is noted that path segment $PS_{31}$ drops vertically to mirror 34 while the segment $PS_{32}$ rises along a 43.3852° angle with the vertical until it reaches the surface 21c of assembly 20, or point CP, and that the common segment CR drops vertically to the lens of the camera. The horizontal distance separating segments $PS_{31}$ and CR is 3.5801 inches and, by calculation $PS_{32}=5.2121$ inches.

The vertical distance from plane C to the lowest point or surface 21c is 6.327 inches, and the distance from the same point on surface 21c to the lens in aperture 22 is 4.6673 inches. These two distances total eleven inches, leaving nine inches for the length of $PS_{32}$ and the portion of $PS_{31}$ below the level of 21c's lowest point. Hence, $RP_1=RP_2=RP_3$.

While not shown, in some instances, it may be desirable to provide for production of stereo pairs of images of each field of view. Preferably, the mirror nearest the plane of the object which is being reflected thereby is employed for this purpose since this will result in the strongest stereo effect. In such instances, each mirror comprises a pair of sections, each being angularly related to the other, and so adjusted so that stereo pairs are provided.

OPERATION

It is believed that in view of the foregoing description the operation of the device will readily be understood and it will be briefly reviewed at this point.

Photographs are provided as three orthogonally related fields of view of the object O are reflected along ray paths $RP_1$, $RP_2$ and $RP_3$ and simultaneously imaged by the system 10 at the film plane FP for providing a quadrifid image QI to be photographically recorded. Thus a quadrifid image comprising three equally well focused orthogonally related fields of view of the object O are presented for simultaneous photographic recordation within the camera 24. While images of fields of view fill only three quadrants, the fourth quadrant is available for presentation of data.

In view of the foregoing, it is believed to be clear that the present invention provides a practical solution to the perplexing problem of accommodating a simultaneous viewing and photographing of images within a single frame of orthogonally related fields of view of a three dimensional object.

What I claim is:

1. In a system for simultaneously forming a quadrifid image at the film plane of a camera consisting of three equally well focused separate images of a plurality of angularly related fields of view of a common three dimensional object, the improvement comprising:
   A. a first reflective means adjacently related to a three dimensional object including surfaces for reflecting an image of a field of view of a first object plane of said object along a first folded path of a given length extended between the first object plane and a film plane of a camera;
   B. second reflective means adjacently related to the three dimensional object including a plurality of surfaces for reflecting an image of a field of view of a second object plane of said object angularly related to said first object plane along a second folded path having a length equal to the length of the first folded path and extended between the second object plane and the film plane;
   C. third reflective means adjacently related to the three dimensional object including a third plurality of surfaces for reflecting an image of a field of view of a third object plane of said object angularly related to said first object plane along a third folded path having a length equal to the lengths of the first and second paths and extended between the third object plane and the film plane; and
   D. means for illuminating each of the object planes including a beam splitter disposed in each of said folded paths and a source of light optically coupled with each of the beam splitters for propagating beams of light along axes extended toward said object.

2. In a system for simultaneously forming a quadrifid image at the film plane of a camera consisting of three equally well focused separate images of a plurality of angularly related fields of view of a common three dimensional object, the improvement comprising:
   A. a first reflective means including at least a pair of reflective surfaces disposed in mutual parallelism adjacently related to a three dimensional object for reflecting an image of a field of view of a first object plane of said object along a first folded path of a given length extended between the first object plane and a film plane of a camera characterized by a plurality of ray path segments including a first terminal path segment perpendicularly related to the film plane;

B. second reflective means including at least a pair of reflective surfaces disposed in mutual parallelism adjacently related to the three dimensional object for reflecting an image of a field of view of a second object plane of said object angularly related to said first object plane along a second folded path having a length equal to the length of the first folded path and extended between the second object plane and the film plane and characterized by a plurality of ray path segments, including a second terminal path segment coincident with said first terminal path segment;

C. third reflective means including at least a pair of reflective surfaces disposed in mutual parallelism adjacently related to the three dimensional object for reflecting an image of a field of view of a third object plane of said object angularly related to said first and second object planes along a third folded path having a length equal to the lengths of the first and second paths and extended between the third object plane and the film plane and characterized by a plurality of ray path segments, including a third terminal path segment coincident with said first and second terminal path segments; and D. means for illuminating each of the object planes including a beam splitter disposed in each of said folded paths, and a source of light optically coupled with each of the beam splitters for propagating beams of light along axes extended toward said object.

* * * * *